(12) United States Patent
de Varennes et al.

(10) Patent No.: US 6,609,081 B1
(45) Date of Patent: Aug. 19, 2003

(54) AUTOMATED EXPANSION ANALYZER FOR TELECOMMUNICATIONS POWER SYSTEMS

(75) Inventors: Christian de Varennes, Montreal (CA); Pierre Got, Montreal (CA); Louis Duguay, Dollard-des-Ormeaux (CA)

(73) Assignee: Astec International Limited, Kowloon (HK)

( * ) Notice: Subject to any disclaimer, the term of this patent is extended or adjusted under 35 U.S.C. 154(b) by 133 days.

(21) Appl. No.: 09/587,096

(22) Filed: Jun. 2, 2000

(51) Int. Cl.[7] .......................... G01L 3/26; G01M 15/00; G06F 15/00
(52) U.S. Cl. ......................................... 702/176; 73/112
(58) Field of Search ..................... 702/61, 176; 73/112; 370/254; 340/568.1; 705/15

(56) References Cited

U.S. PATENT DOCUMENTS

| | | | |
|---|---|---|---|
| 5,332,927 A | * | 7/1994 | Paul et al. ..................... 307/66 |
| 5,416,725 A | * | 5/1995 | Pacheco et al. ............. 364/514 |
| 5,514,946 A | * | 5/1996 | Lin et al. ....................... 320/31 |
| 6,104,798 A | * | 8/2000 | Lickiss et al. ............... 379/201 |
| 6,115,276 A | * | 9/2000 | Mao ............................. 363/127 |
| 6,157,164 A | * | 12/2000 | Jaworski et al. ............. 320/116 |
| 6,191,500 B1 | * | 2/2001 | Toy ............................... 307/64 |
| 6,240,337 B1 | * | 5/2001 | Marr, Jr. et al. ............. 700/286 |
| 6,255,801 B1 | * | 7/2001 | Chalasani .................... 320/132 |

\* cited by examiner

*Primary Examiner*—Marc S. Hoff
*Assistant Examiner*—Mary Catherine Baran
(74) *Attorney, Agent, or Firm*—Harness, Dickey & Pierce, P.L.C.

(57) ABSTRACT

Processor-implemented monitor and control modules gather operating data from the rectifier units, battery connection units and power distribution units. From these data, statistical operating data are calculated and stored in a database managed by the resident processor within the power system control unit. The system expansion analysis module analyzes the statistical data in view of a set of predetermined warning and alarm threshold parameters, which may be factory specified or user settable. If an alarm or upgrade condition is detected, the system expansion analysis module generates an upgrade notification that is optionally sent in a variety of forms including local audible or on screen notification, remote alarm through network connection to a remote computer, via internet web browser and e-mail message. The system can also optionally initiate automated order processing to place orders for upgrade or expansion equipment and installation services.

11 Claims, 6 Drawing Sheets

AUTOMATED EXPANSION ANALYZER FOR TELECOMMUNICATIONS POWER SYSTEMS

BACKGROUND AND SUMMARY OF THE INVENTION

The present invention relates generally to power systems for telecommunications equipment and networks. More particularly, the invention relates to an automated system for analyzing the operating status of a power system and for assessing when modules within the power system need to be upgraded. In one embodiment the automated system initiates an electronic commerce transaction to place the order for the upgrade equipment.

Telecommunications systems use comparatively sophisticated, modular power systems that provide power even during AC power outages. The power system and its associated reserve power subsystems (e.g., storage batteries, diesel-powered generators, etc.) represent a sizable financial investment. In addition to the costs of the equipment itself, the administrative costs to operate the equipment are quite substantial. Aside from the day-to-day operations needed to run the telecommunications system and its power system, there is the additional administrative burden of monitoring when the power system needs to be repaired or upgraded. Due to the complexity of these systems, these maintenance and upgrade activities are not as simple as they might first appear.

A power system is usually engineered and configured when the system is first installed. The design engineer estimates how much load will be required, what duration is needed for the reserve power systems, and so forth, and designs the power system accordingly. However, a telecommunications system is not a static entity. New pieces of equipment may be added from time to time to support new customers. The engineering departments responsible for adding new equipment to support new users may not necessarily have responsibility for monitoring and upgrading the power system. An engineer installing a new switch or router, for example, might simply consider the power system to be adequate, based on current power usage, and may therefore not ascertain that under different load conditions the power system may need to be upgraded.

In an effort to make these power systems easier to use and maintain, the invention provides an automated expansion analyzer that monitors each of the components of the power system and automatically assesses when expansion or upgrade is called for. In power systems made up of modular units, the invention analyzes each modular unit and determines when additional modular units should be procured. The system supports both local and remote display of upgrade notification messages, and is further capable of providing notification by e-mail message. In one embodiment the system will further initiate electronic commerce transactions to place the required upgrade modules on order so that they will be automatically shipped to the site for installation.

In accordance with one aspect of the invention, the automated expansion analyzer includes a monitor system that is coupled to the power system for obtaining operating state information from at least one of the power system's subsystems. In the preferred implementation, these subsystems comprise modular units, such units include rectifier units, battery connection units and power distribution units. The monitor system also obtains information about the reserve power batteries coupled to the battery connection unit or units. A system expansion analysis module communicates with the monitor system. The analysis module has a data store that contains at least one alarm threshold parameter. The system expansion analysis module employs a processor for assessing the operating state information vis-a-vis the alarm threshold parameter or parameters. The system further includes a user interface module that communicates with the analysis module to provide upgrade notification with respect to a selected one of the subsystems, before the capacity of that subsystem is reached.

The automated expansion analyzer can significantly reduce the cost of ownership by greatly simplifying the system monitoring and upgrading functions. When the system senses that the overall load is approaching a predetermined threshold parameter, additional rectifier units may be required. The system will notify the owner and, if desired, automatically place an order for the requisite number of rectifier units. As loads increase, the analyzer can also determine that additional battery strings need to be ordered, in order to provide the backup power duration specified during the initial system design. The need for additional battery connection units may also be assessed and ordered. Similarly, when the system detects that the power distribution unit or units are reaching capacity an additional power distribution unit may be indicated and placed on order. Such condition could occur, for example, when a predetermined number of load connections (circuit breaker-protected) have been made, or when the maximum capacity of the distribution unit has been reached.

The analyzer is flexible enough to include multiple sets of threshold parameters so that the user can define a set of warning threshold parameters to send alert messages before the over-capacity thresholds have been reached. This gives the system operator a great deal of flexibility in customizing the upgrade plan to match the company's business structure.

For a more complete understanding of the invention, its objects and advantages, refer to the following specification and to the accompanying drawings.

DETAILED DESCRIPTION OF THE PREFERRED EMBODIMENT

Figure 1:
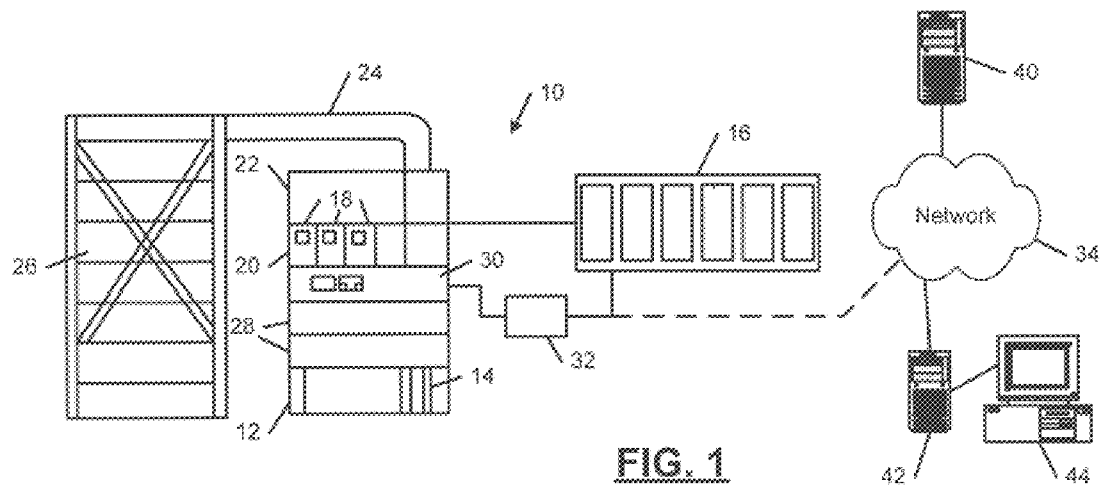
FIG. 1 is a block diagram of an exemplary telecommunications power system.

An exemplary telecommunications power system is illustrated generally at 10 in FIG. 1. The system consists of a rack mount chassis 12 into which a plurality of individual modular units are installed. The modular units share a common data bus 14, which may be attached to one of the rails of the rack mount unit. In a presently preferred embodiment, the data bus is designed to carry data signals using the CAN bus protocol. Although other protocols may be used, the CAN bus protocol is presently preferred because it is relatively robust in the presence of electrical noise such as would be expected in a power system.

An exemplary piece of telecommunications equipment is illustrated at 16. The power system supplies DC power to equipment 16 through one or more circuit breakers 18 that are installed in a modular distribution unit 20. The power system is designed to supply power even during AC power outages. A battery connection unit 22 serves this function. The battery connection unit 22 is connected through heavy duty cable 24 to a suitable reserve power source, such as a rack of rechargeable batteries 26. During power outages, DC power is supplied through cable 24 to the battery connection unit 22 to, in turn, supply power to the telecommunications equipment 16. During normal operation, when AC power is present, the rechargeable batteries 26 are charged by supplying charging current through cable 24.

The power system also includes one or more rectifier units 28 (two are illustrated in FIG. 1). These rectifier units are connected to receive alternating current from the AC power mains and rectify that current into suitable DC current at a voltage controlled by the rectifier unit. Typically, each rectifier unit supplies DC current at a voltage that will properly power the telecommunications equipment 16 and also maintain the batteries 26 at a proper float voltage for charging. In this regard, storage battery subsystems in a typical telecommunications installation represent a significant part of the costs of the system. Thus, it is desirable to maintain the batteries at the proper manufacturer-dictated voltage during charging.

To coordinate the operation of the above-described modular units, a master control unit 30 is provided. The master control unit handles many of the power system control and monitoring functions and is instrumental in gathering and assimilating the data needed to implement the automated upgrade analyzer system. The master control unit communicates with each of the other modules via bus 14, as will be more fully described below. The master control unit is also coupled through a suitable network interface 32 to a telecommunications network or computer network such as the internet. In FIG. 1 these networks are collectively depicted at 34. Because the power system is typically in close proximity to telecommunications equipment 16, in some implementations, the network interface 32 may be directly connected to the telecommunications equipment 16, as illustrated by solid line in FIG. 1. Of course; other connections to network 34 are also possible as depicted diagrammatically by dashed line.

The connection of master control unit 30 to network 34 places the master control unit in potential communication with other computers attached to the network. These can include computers attached locally, such as computer 40 that comprises part of the local area network or wide area network of the telecommunications installation. Such computers can also include remotely attached computers such as computer 42 and its associated work station 44. As will be more fully explained, the automated upgrade analyzer system is capable of communicating via network 34 in a variety of sophisticated ways, to send alarm messages and upgrade notifications to the proper authorities when units within the power system need to be upgraded or replaced. These communications can also effect electronic commerce transactions to place orders, initiate shipment and installation orders, effect electronic funds transfer for payment and make appropriate entries in accounting and system configuration records, all based on information gathered and analyzed at the local power system.

Figure 2:
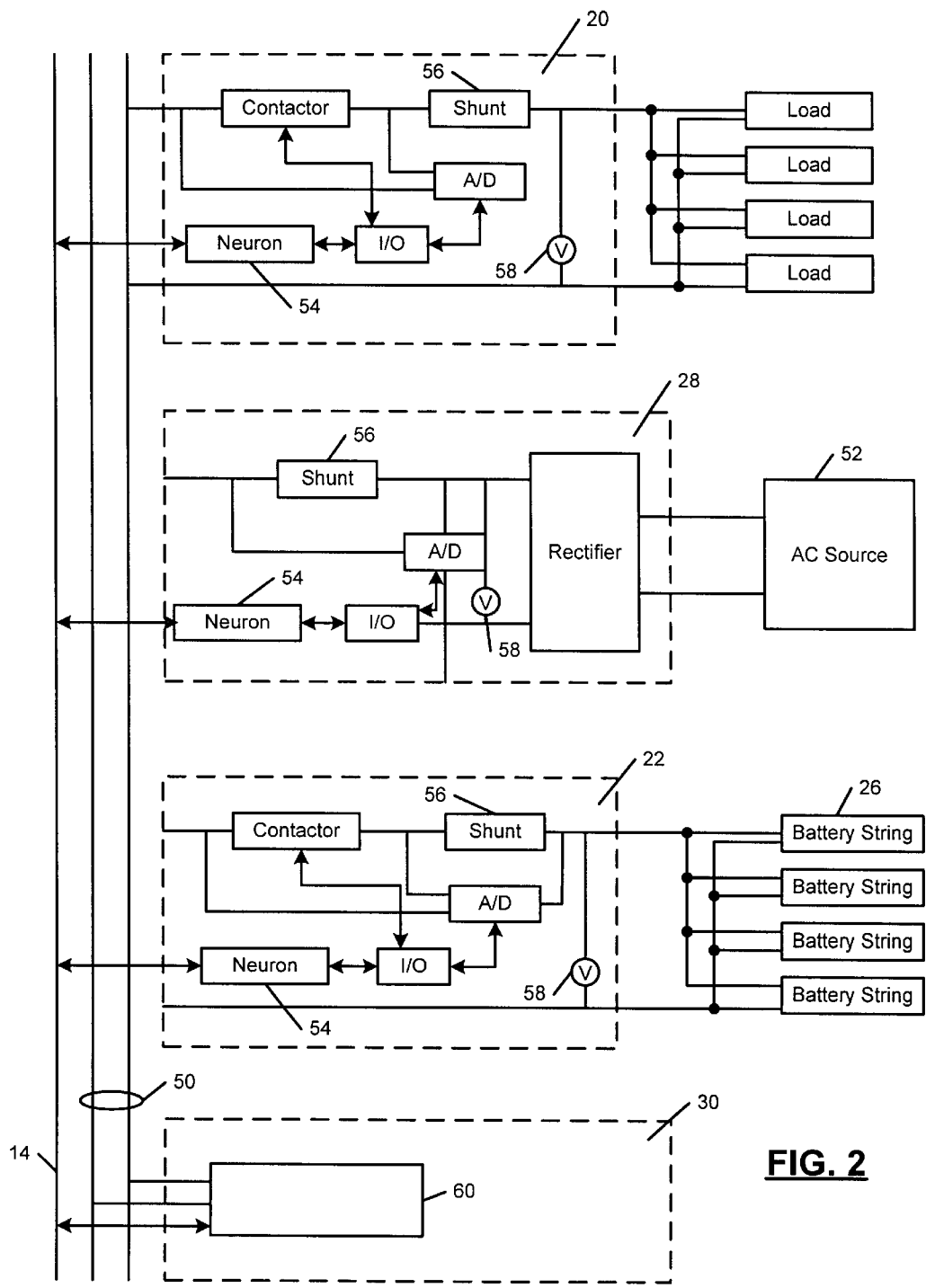
FIG. 2 is a block electronic circuit diagram illustrating how the modular units of a typical power system are configured.

FIG. 2 shows in greater detail how the modular units of the power system are connected both to communicate over bus 14 and also to share a common DC bus 50. AC power is supplied from the AC mains 52 to the rectifier unit 28. The rectifier unit converts the AC current into DC current and establishes the voltage at a predetermined voltage based on control instructions stored within a microprocessor unit 54, referred to as a "neuron." The neuron is a microprocessor having onboard nonvolatile memory for storing local data values used to establish the output voltage of the rectifier. The neuron also stores values indicative of measured voltages and currents within the rectifier unit. These values are periodically supplied to the master control unit over bus 14. Specifically, the rectifier includes a shunt circuit 56 that measures the current flowing between the rectifier unit and DC bus 50. Another sensor 58 measures the rectifier output voltage. Both current and voltage measurements are supplied to neuron 54 for storage in local nonvolatile memory.

The battery connection unit 22 is similarly configured. It includes a neuron processor 54 and also suitable shunt and voltage sensors for measuring the current flowing between the power distribution unit and DC bus 50 as well as the voltage at the output. The reserve power unit is further coupled to rechargeable batteries 26 so that the batteries may be charged during normal operation and may be used to supply current to DC bus 50 when the AC mains are off-line. In addition, the reserve power unit includes a contactor, such as a solenoid operated contactor, that will break connection to DC bus 50 when signaled to do so by neuron 54.

The distribution unit 20 is configured in a similar fashion to include neuron 54 as well as shunt sensor 56 and voltage sensor 58. The power distribution unit may optionally include additional shunt sensors to measure the current flowing through each individual circuit breaker that supplies current to the telecommunications system load. Thus, the neuron 54 of power distribution unit 20 stores voltage and current information indicative of the total current being supplied to the telecommunications system load, and optionally how much current is being supplied through each of the individual breakers.

Master control unit 30 lies at the heart of the system. It provides most of the system-level monitor and control functions for the power system. Master control unit 30 is connected to DC bus 50 and also to data bus 14 as the other modules are connected. It includes a more powerful processor 60 that communicates with the neurons of the other modules, supplying individual data values to those modules and collecting individual voltage and current values from those modules.

The system architecture is configured so that the individual modules operate independently of one another and without requiring constant communication with processor 60 of the master control unit 30. Thus, the rectifier module, for example, can be provided with default operating parameters and it will perform its rectifying function using those default parameters without requiring further instruction from the master control unit. The default values can be changed by the master control unit through communication between processor 60 and neuron 54 over data bus 14.

Figure 3:
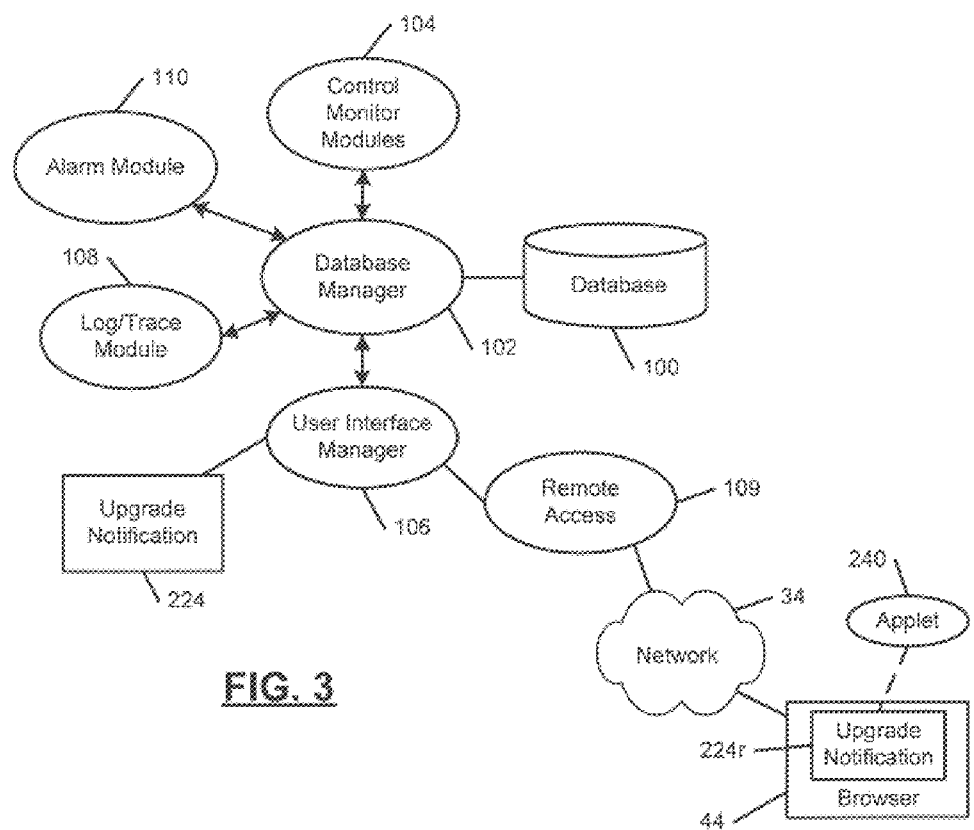
FIG. 3 is a data flow diagram illustrating how the upgrade notification system is implemented in software.

FIG. 3 shows the pertinent software components implemented by processor 60 to manage the system expansion analysis and upgrade notification functions. Like the neurons, the processor of the master control unit stores values indicative of operating conditions and control parameters. However, unlike the neurons, which store only local values, the processor 60 of the master control unit stores collective values obtained from all of the other units, as well as additional values that are input by the system operator during system configuration or that are calculated by processor 60 in performing the monitor and control functions.

In the presently preferred embodiment, processor 60 maintains a database 100 that is administered by a database manager module 102. Other software modules communicate with database manager module 102, establishing database manager module 102 as the communication pipeline between other software modules. For example, in FIG. 3, the control and monitor modules 104 are illustrated as communicating with database manager module 102. User interface manager module 106 also communicates with database manager 102. Thus, if the user interface manager module 106 needs to communicate with one of the control and monitor modules 104, it will do so by passing information to the database manager 102. The database manager, in turn, stores the passed information as data values in database 100. The recipient module then reads those values from database 100 using the services of database manager 102.

In the presently preferred embodiment, the system software employs or instantiates a control and monitor module 104 for each of the hardware units plugged into the power system. Thus, in a typical system there would be a control and monitor module associated with reserve power unit 22, another control and monitor module assigned to distribution module 20, and one or more additional control and monitor modules assigned to rectifier units 28. Each of these control and monitor modules is responsible for collecting operating current and voltage information from their respective units and communicating that information to database manager 102 for storage in database 100. Each control and monitor modules is also responsible for changing any of the default settings within its assigned unit. Thus, if the rectifier voltage needs to be raised from 54.2 to 54.4 volts, the control and monitor module associated with the rectifier unit would obtain the new voltage setting from database 100 (via database manager 102) and send that value to the neuron of the associated rectifier for placement into the local nonvolatile storage of the rectifier. The rectifier would then respond by raising its voltage accordingly.

The user interface manager module 106 is responsible for supplying information to the user through either a local display screen associated with the master control unit or through a remote computer attached to network 34. In the presently preferred embodiment, the user interface manager delivers a Java applet through network 34 to an attached computer. The applet then runs within a standard internet browser and allows the user to interact with the power system in the same way as a user would interact if operating through the local display screen.

The presently preferred embodiment maintains a history log within database 100 that documents when certain events have occurred, such as over current conditions, AC power outage conditions, voltage and current spikes, and the like.

The system utilizes a log/trace module 108 to gather and process the historical event information. Module 108 communicates with database manager 102 to store these data within a history log file within database 100. The history log data are useful, for example, when analyzing a system to determine when and why certain abnormal events have occurred, as a means of diagnosing system problems.

The data collected by log/trace module 108 are used by alarm module 110 to assess when certain operating conditions are at levels that warrant the operator's attention. Alarm module 110 communicates through database manager 102 with database 100. It periodically examines the values in database 100, including values obtained by the control and monitoring modules 104 and by the log/trace module 108. Alarm module 110 analyzes the stored values to determine when system expansion is warranted.

Figure 4:
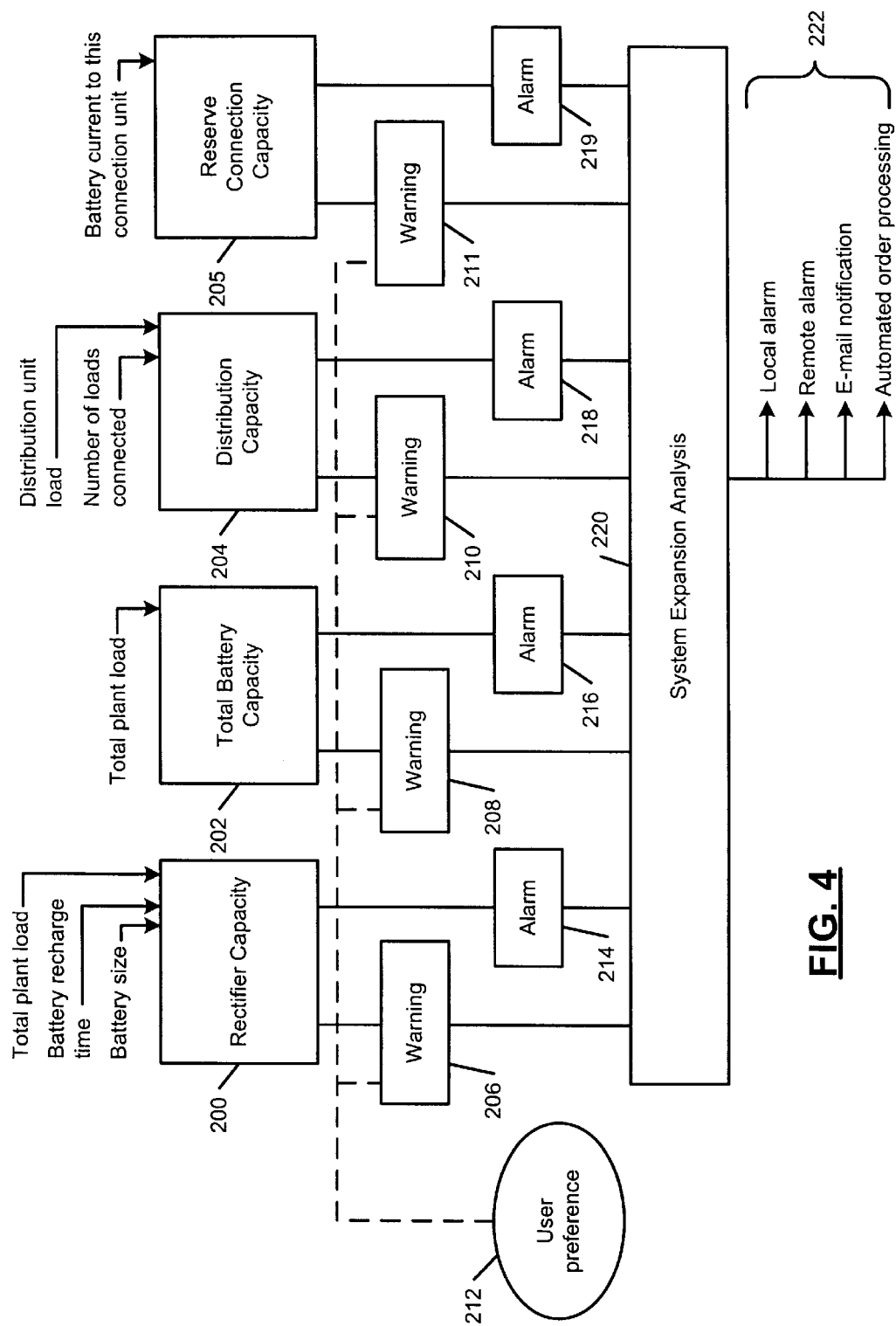
FIG. 4 is a block diagram illustrating how the system expansion analysis is performed in the preferred embodiment.

FIG. 4 shows the presently preferred system expansion analysis process performed by the alarm module 110. The analysis assesses rectifier capacity, reserve battery system capacity, distribution capacity and reserve connection capacity. Rectifier capacity involves the basic question of whether there are a sufficient number of rectifier modules, of sufficient size, to handle the telecommunications system load and the battery recharge requirements. Storage capacity involves the basic issue of whether sufficient storage battery capacity is available to maintain the telecommunications system in operation for a predetermined time. Distribution capacity involves the issue of whether the distribution unit has adequate head room to supply the maximum plant load and whether there is an adequate number of circuit breakers.

When the power system is initially configured, the engineer selects the proper number of rectifier units, the proper number of battery strings and battery connection units, and the appropriate number of distribution units and circuit breakers to handle the anticipated system load with an appropriate reserve power backup time. However, as additional loads are added to the system over time, the originally designed system may no longer be adequate. This is where the system expansion analysis comes into play.

Alarm module 110 performs statistical analysis of the values stored in database 100. The values stored in database 100 represent both the most recently measured voltage and current readings from the other modules and also the event data stored in the history log file. The alarm module 110 examines these data to generate statistics that are then used to assess rectifier capacity, storage capacity and distribution capacity.

FIGS. 4 and 5–8 illustrate how the statistical analysis is performed to assess these capacities. Referring to FIG. 4, rectifier capacity is assessed by calculation block 200 using the total plant load, battery recharge time and battery size as inputs. Battery storage capacity is calculated by block 202 using the total plant load as the input value. Distribution capacity is calculated by block 204 using the distribution unit load and the number of loads (circuit breakers) used as input values. Reserve connection capacity is assessed by calculation block 205 using battery current to a given connection unit as the input value.

Figure 5:
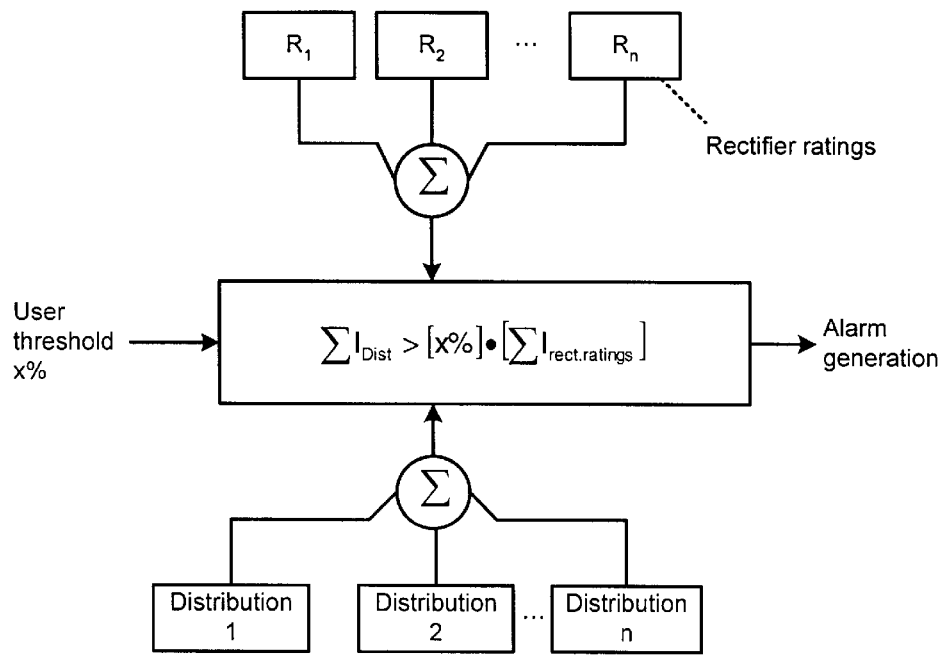
FIG. 5 is a block diagram illustrating more specifically how the rectifier capacity alarm is calculated in the preferred embodiment.
Figure 6:
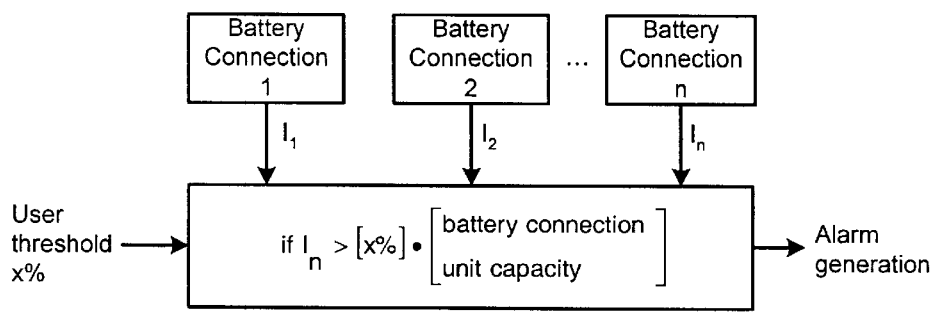
FIG. 6 is a block diagram illustrating more specifically how the battery connection unit capacity alarm is calculated in the preferred embodiment.
Figure 7:
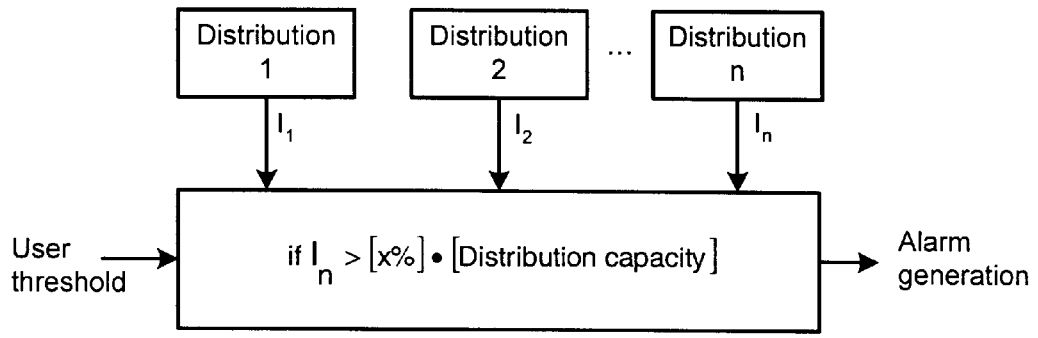
FIG. 7 is a block diagram illustrating more specifically how the distribution unit capacity alarm is calculated in the preferred embodiment.
Figure 8:
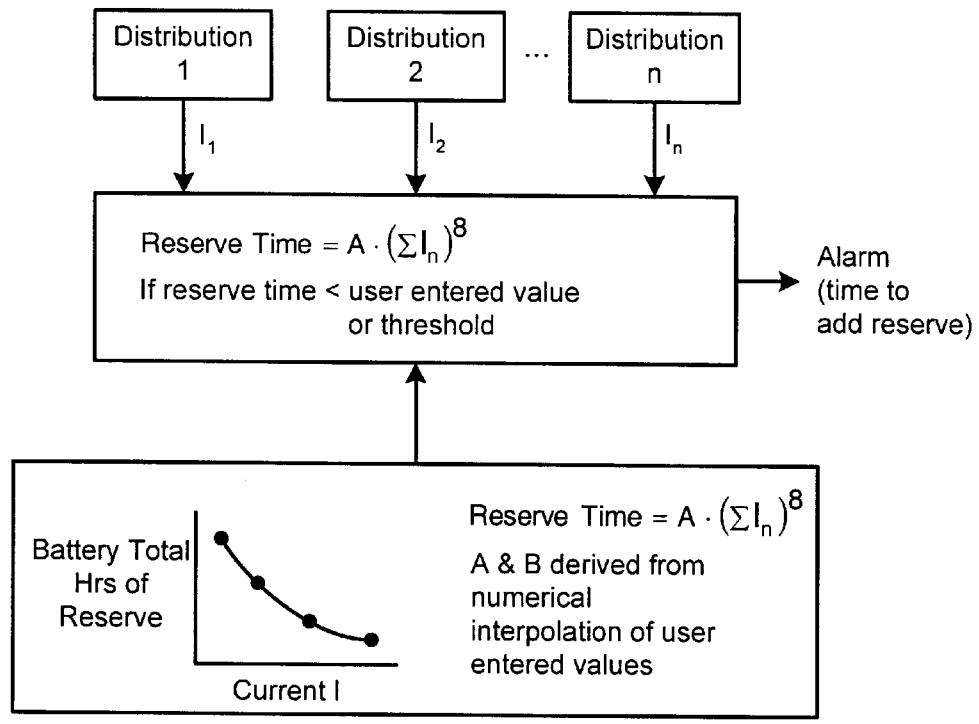
FIG. 8 is a block diagram illustrating more specifically how the reserve battery capacity alarm is calculated in the preferred embodiment.

FIG. 5 shows in greater detail the algorithm performed by block 200 in assessing rectifier capacity. FIG. 6 is a similar diagram showing the algorithm used by block 202 to assess total battery capacity. The algorithm used by block 204 to calculate distribution capacity is shown in FIG. 7 and the algorithm used by block 205 to assess reserve connection capacity is shown in FIG. 8.

Each of the calculation blocks 200, 202, 204, and 205 can compare the calculated capacity value against two different thresholds, a warning threshold and an alarm threshold. The warning thresholds, illustrated in FIG. 4 at 206, 208, 210, and 211 may be set by user preference as depicted at 212. The alarm thresholds 214, 216, 218, and 219 are normally set to represent a predetermined percentage of the over capacity condition. As illustrated, each of the warning thresholds and each of the alarm thresholds can be individually set for the three different capacity calculations.

When any of the warning or alarm thresholds are reached, the system expansion analysis calculation block 220 examines the state of all warning and alarm conditions and generates the appropriate output. If the rectifier capacity reaches the warning threshold, for example, the system expansion analysis module will construct the appropriate warning message which is then sent by a variety of different means as discussed below. If the condition that caused the rectifier capacity to exceed the warning threshold also caused the distribution capacity to exceed its warning threshold, then the system expansion analysis module constructs the appropriate message to notify the user that both conditions need to be attended to.

The presently preferred embodiment generates both local and remote alarms as well as providing e-mail notification of the alarm conditions and even effecting automated order processing as illustrated by outputs 222. Referring to FIG. 3, the local alarm notification (which can be based on either a warning threshold or an alarm threshold) is supplied via user interface manager 106 to the local display screen as an upgrade notification 224. A similar upgrade notification message may also be displayed on a remote computer 44 running suitable browser software. This is accomplished by a remote access module 109 that communicates with the user interface manager 106 and also with network 34. The user interface manager 106 downloads a Java applet 240 via network 34 to the remote computer 44. The applet runs within the browser application of remote computer 44. The user interface manager then sends the upgrade notification through the remote access module and via the network to the applet 240 for display on the browser screen as upgrade notification 244r.

The presently preferred embodiment uses TCP/IP protocol for communicating messages over network 34 to the applet 240. In this regard, the remote access module 109 is configured to package upgrade notification messages within appropriate TCP/IP headers for transmission over network 34 to the applet. The applet then unpacks the message by stripping away the TCP/IP headers to display the upgrade notification within the browser screen.

Because the upgrade notification messages may be sent at any time, the remote access mechanism is preferably constructed using push technology. In other words, applet 240 (or its host web browser) periodically interrogates the remote access module 109 to determine if there is any new information to report. If any upgrade notification has been triggered through the system expansion analysis calculation, the remote access module 109 notifies applet 240 of this fact and then participates in a series of message exchanges whereby the upgrade notification is downloaded to the applet for display. While push technology is presently preferred, it will be appreciated that the invention could be implemented using pull technology whereby the responsibility to request upgrade notification messages is initiated by the user of the remote computer.

The remote messaging capability whereby remote access module 109 sends upgrade notifications to a remote computer 44 can be further exploited to generate more complex forms of messaging and electronic commerce.

Figure 9:
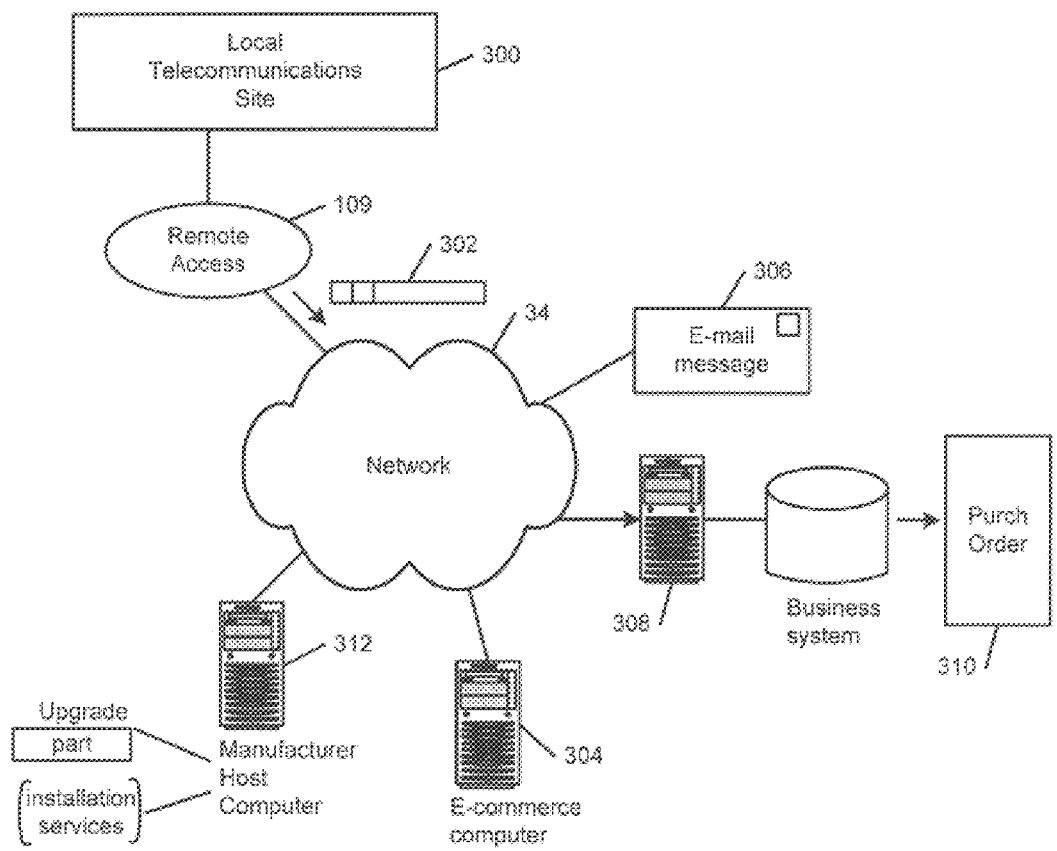
FIG. 9 is a block diagram illustrating further details of the e-commerce capabilities of the upgrade analyzer.

FIG. 9 illustrates some of these more sophisticated transactions in greater detail. In FIG. 9 the local telecommunications site is depicted diagrammatically by block 300, with the remote access module 109 being separately shown. Refer to FIG. 3 to review how remote access module 109 integrates with the remaining components of the system.

When an upgrade notification is generated (based on either a warning threshold or an alarm threshold) the remote access module 109 transmits a TCP/IP packet 302 over network 34. The packet includes the identity of the local telecommunications site, as well as other pertinent information regarding the upgrade notification. Packet 302 is sent to an e-commerce host computer 304, which assembles a collection of information needed for subsequent e-mail messages and e-commerce transactions. In this regard, the database 100 (FIG. 3) of each master control unit 30 maintains a complete record of all installed units, including pertinent serial number data and interconnection data. When the upgrade notification message is sent, the e-commerce computer 304 communicates with the local telecommunications site to request additional information from database 100, so that it can prepare a detailed report concerning the local telecommunications site. The detailed report may include, for example, a listing of all of the installed components, including pertinent connection information and circuit diagrams, showing which components are connected to each other. The nature of the upgrade notification message is then assessed in context of this additional information, and a detailed electronic report is generated by the e-commerce computer 304. The e-commerce computer may then send one or more e-mail messages 306 over network 34. The messages may include all or portions of the detailed report to one or more e-mail recipients, as appropriate. Thus, the telecommunications business office can be notified that an upgrade will need to be scheduled, while the engineering department may be notified of particular engineering details concerning the recommended upgrade.

If desired, e-commerce computer 304 can also communicate directly with a business system computer 308 that is also connected to network 34. The business system computer 308 may be, for example, connected with the business system and accounting system computers employed by the telecommunications operation. The business system responds to the message received from computer 304 by generating appropriate purchase orders 310 for use in ordering the recommended upgrade equipment.

If desired, the entire order processing function can be automated further. In such case, the e-commerce computer 304 sends a message through network 34 to the host computer 312 of the manufacturer or supplier of upgrade parts and installation services. Thus, the local telecommunications site can be furnished with upgrade parts and services automatically in response to an upgrade notification message.

From the foregoing it will be appreciated that the automated upgrade analyzer of the present invention has the potential to greatly simplify the management and maintenance of power systems for telecommunications equipment. Because the system expansion analysis and upgrade notification tasks are fully automated, telecommunications companies no longer need to devote expensive engineering resources to these tasks. Much of the routine system expansion and upgrade processing can be handled by business offices, with far less need to rely on periodic local visits by engineers or technicians.

While the invention has been described in its presently preferred form, it will be understood that the invention is capable of modification without departing from the spirit of the invention as set forth in the appended claims.

What is claimed is:

1. An automated upgrade analyzer for an electric power system of the type having one or more rectifier subsystems, one or more reserve power subsystems and one or more power distribution subsystems, comprising:

a monitor system coupled to said power system for obtaining operating state information from at least one of said subsystems;

a system expansion analysis module communicating with said monitor system, said system expansion analysis module having a data store containing at least one alarm threshold parameter and a processor for assessing said operating state information vis-à-vis said alarm threshold parameter; and a user interface module communicating with said system expansion analysis module for providing upgrade notification with respect to a selected one of said subsystems before the capacity of said subsystem is reached.

2. The analyzer of claim 1 wherein said user interface module communicates over a network with an automated order processing host computer to requisition an upgrade component for said selected one of said subsystems.

3. The analyzer of claim 1 wherein said user interface module communicates over a network to send an electronic mail notification message regarding said selected one of said subsystems.

4. The analyzer of claim 1 wherein said user interface module communicates with a local display associated with said power system to provide an upgrade notification message.

5. The analyzer of claim 1 wherein said user interface module communicates over a network with a remote computer to provide an upgrade notification message for display by said remote computer.

6. The analyzer of claim 1 wherein said user interface module communicates over a network with an applet running in a browser on a remote computer to provide an upgrade notification message for display by said remote computer.

7. The analyzer of claim 1 wherein said electric power system is of the type that employs at least one rechargeable storage battery and wherein said expansion analysis module assesses rectifier subsystem capacity based on total power output by said electric power system, battery recharge time and battery size.

8. The analyzer of claim 1 wherein said electric power system is of the type that employs at least one rechargeable storage battery and wherein said expansion analysis module assesses capacity of said storage battery based on total power output by said electric power system to a load.

9. The analyzer of claim 1 wherein said electric power system is of the type in which the power distribution subsystem provides connectivity for a predetermined number of load connections and wherein said expansion analysis module assesses power distribution subsystem capacity based on distribution unit load and the number of load connections.

10. The analyzer of claim 1 wherein said reserve power subsystem includes at least one reserve connection unit to which at least one rechargeable battery is attached and wherein said expansion analysis module assesses reserve power subsystem capacity based on the current flowing between said reserve connection unit and said battery.

11. The analyzer of claim 1 wherein said data store contains a first set of alarm threshold parameters representing over-capacity thresholds and a second set of warning threshold parameters representing user-defined capacity thresholds.

\* \* \* \* \*